(12) United States Patent
Hamlin

(10) Patent No.: US 8,105,123 B2
(45) Date of Patent: Jan. 31, 2012

(54) MARINE ELECTRIC GENERATOR FLUSHING SYSTEM

(76) Inventor: Edward W. Hamlin, Altamonte Springs, FL (US)

( * ) Notice: Subject to any disclaimer, the term of this patent is extended or adjusted under 35 U.S.C. 154(b) by 154 days.

(21) Appl. No.: 12/799,835

(22) Filed: May 4, 2010

(65) Prior Publication Data

US 2011/0275258 A1    Nov. 10, 2011

(51) Int. Cl.
*B63B 13/00* (2006.01)
(52) U.S. Cl. .................................. 440/88 N; 440/88 R
(58) Field of Classification Search ............. 440/88 N, 440/88 R
See application file for complete search history.

(56) References Cited

U.S. PATENT DOCUMENTS

| | | |
|---|---|---|
| 3,441,044 A | 4/1969 | Rodriguez |
| 3,550,612 A | 12/1970 | Maxon |
| 4,619,618 A | 10/1986 | Patti |
| 5,263,885 A | 11/1993 | Montague |
| 5,295,880 A | 3/1994 | Parker |
| 6,004,175 A | 12/1999 | McCoy |
| 7,025,643 B1 | 4/2006 | Csitari |
| 7,625,256 B2 | 12/2009 | Bertino et al. |
| 2006/0068657 A1* | 3/2006 | Csitari ................. 440/88 N |

* cited by examiner

*Primary Examiner* — Lars A Olson
(74) *Attorney, Agent, or Firm* — William M. Hobby, III

(57) ABSTRACT

A marine electric generator flushing system for a boat has a liquid container attached in the generator raw cooling water intake line and mounted in a boat hull positioned along the water line of the boat. The liquid container has a fresh water inlet that allows a fresh water hose to be connected thereto and which automatically blocks the raw water line anytime fresh water is entering the liquid container so that fresh water is drawn through the generator cooling system.

8 Claims, 2 Drawing Sheets

MARINE ELECTRIC GENERATOR FLUSHING SYSTEM

BACKGROUND OF THE INVENTION

This invention relates generally to the flushing of a water cooled inboard marine powered generator with fresh water and to the winterization of such generators.

Cooling systems of internal combustion engines, such as inboard marine engines, power generators and air conditioning units installed on power boats use raw water drawn from an ambient body of water on which the boat operates. Raw water, such as salt water or water from a lake or river, is corrosive to marine cooling systems, so that to protect the cooling systems, regular and proper flushing with fresh water is needed to prolong the life expectancy and to improve the performance of engines, power generators and air conditioning units. Similarly, such marine engines, power generators and air conditioning units on a boat need to be winterized by flushing the cooling systems with fresh water and filling them with anti-freeze or the like. Most currently operated cooling systems of inboard marine engines including inboard powered generators and air conditioning units do not have flushing and winterizing units installed. The boat owners resort to flushing and winterizing of inboard systems by disconnecting the raw water intake conduit from the raw pickup valve, or seacock, and connecting a fresh water hose thereto for flushing the system. This is sometimes accomplished by the adding of a flushing valve into the cooling line to allow the quick connection of a garden hose while closing off the raw water intake with a valve and applying fresh water to the cooling system.

However, you should never affix a garden hose directly to the intake hose of a marine generator. Applying water under pressure to the generator can damage the generator.

To safely flush a marine electrical generator generally requires disconnecting the raw water intake hose and placing the end into a bucket. The bucket is continuously filled with fresh water from a garden hose with the generator engine running so that the impeller pump from the cooling system draws fresh water from the bucket into and through the electric generator's cooling system. This requires that fresh water from a garden hose be continuously fed to the bucket so that the bucket will not run out of water and cause a forced overheat shutdown and damage to the impeller pump and risk of impeller parts being sucked into the cooling system which can damage the generator. This is a time consuming and inconvenient procedure since there is generally poor accessability to the raw water intake pipe and there is limited working space for a bucket. This in turn leads to insufficient and infrequency flushing and inefficient or less safe generator operation. The raw water intake hose and its hose clamps have to be disconnected and reconnected from the raw water pickup valve which can be quickly worn out and damaged. Similar to flushing and winterizing of the marine electric generator, it is usually done once a year with the same inconveniences and expense required in flushing the cooling system. This expense makes it less likely that the cooling system of the electric generator is kept clean which allows a buildup of corrosion in the cooling system.

There are a number of devices known in the prior art for flushing and winterizing marine engine systems and these include the Csitari U.S. Pat. No. 7,025,643 for a quickflush valve kit for flushing and winterizing of the cooling system of inboard marine engines, power generators, air-conditioning units, and sailboat engines. This flushing system places a valve in the raw water intake of a marine, engine which allows raw water to be cut off and replaced with fresh water directly from a water hose. A similar flushing system can be seen in the patent to Maxon, U.S. Pat. No. 3,550,612, and in the Bertino et al. U.S. Pat. No. 7,625,256.

In the Parker U.S. Pat. No. 5,295,880, a flushing valve for inboard boat engines works in a similar way but has a pair of check valves interconnected in the raw water intake which allows a hose to be connected to replace the raw water intake to the engine. In the Rodriguez, U.S. Pat. No. 3,441,044, a pressure actuated flush valve is provided for flushing marine engines which also includes a valve switching mechanism controlled by the pressure of the fresh water supply when connected to direct fresh water through the engine for flushing out the sea water. The McCoy U.S. Pat. No. 6,004,175 is a flush valve also working with a check valve for connecting a fresh water supply into the cooling line for a marine engine. In the Patti U.S. Pat. No. 4,619,618 a fresh water flushing kit is provided for allowing the engine cooling system to be flushed out with fresh water. The Montague U.S. Pat. No. 5,263,885 is for an electronic winterizer installed on the interior of a boat to winterize an inboard/outboard engine.

The present invention is a marine electric generator flushing system for a boat which is mounted in the boat at the water level of the boat and allows the electric generator to be flushed without damage to the generator that might result from a direct connection of a fresh water hose.

SUMMARY OF THE INVENTION

A marine generator flushing system for a boat has a liquid container mounted in the boat hull positioned with the water level of the boat. The container has an inlet conduit connected to the exterior of the boat hull for the passage of raw water therethrough for the cooling of the marine electric generator. The conduit also has an outlet conduit connected between the liquid container and the marine electric generator for passing cooling water from the liquid container through the electric generator. An exhaust conduit is connected between the marine electric generator and the exterior of the boat for the passage of cooling water from the electric generator. A float valve is located in the liquid container. A fresh water inlet is connected into the liquid container and into the float valve for feeding fresh water into the liquid container through the float valve when connected to a fresh water source, such as a garden hose. An inlet valve is located in the liquid container for closing the raw water inlet when actuated. The inlet valve has a water actuated piston and has a water line connected to the fresh water inlet for actuating the inlet valve with pressurized fresh water from the fresh water inlet. Thus, the inlet valve is automatically actuated to close the container inlet any time water is applied under pressure from the fresh water inlet. The float valve is located within the liquid container and controls the level of fresh water entering when the fresh water source is connected to the fresh water inlet to maintain a constant water level within the liquid container so that the liquid container has the raw sea water cut off when fresh water is applied to the fresh water inlet to allow the marine electric generator to be flushed with fresh water from the liquid container. A liquid container has an air-bleed opening in the top thereof.

The main electric generator flushing system allows the marine generator to be automatically flushed when a garden hose or the like is connected to the fresh water inlet which automatically shuts off the raw water inlet. The system also allows for the winterization of the marine generator without removing the boat from the water.

BRIEF DESCRIPTION OF THE DRAWINGS

Other objects, features, and advantages of the present invention will be apparent from the written description and the drawings in which.

DETAILED DESCRIPTION OF THE EXEMPLARY EMBODIMENT

Figure 1:
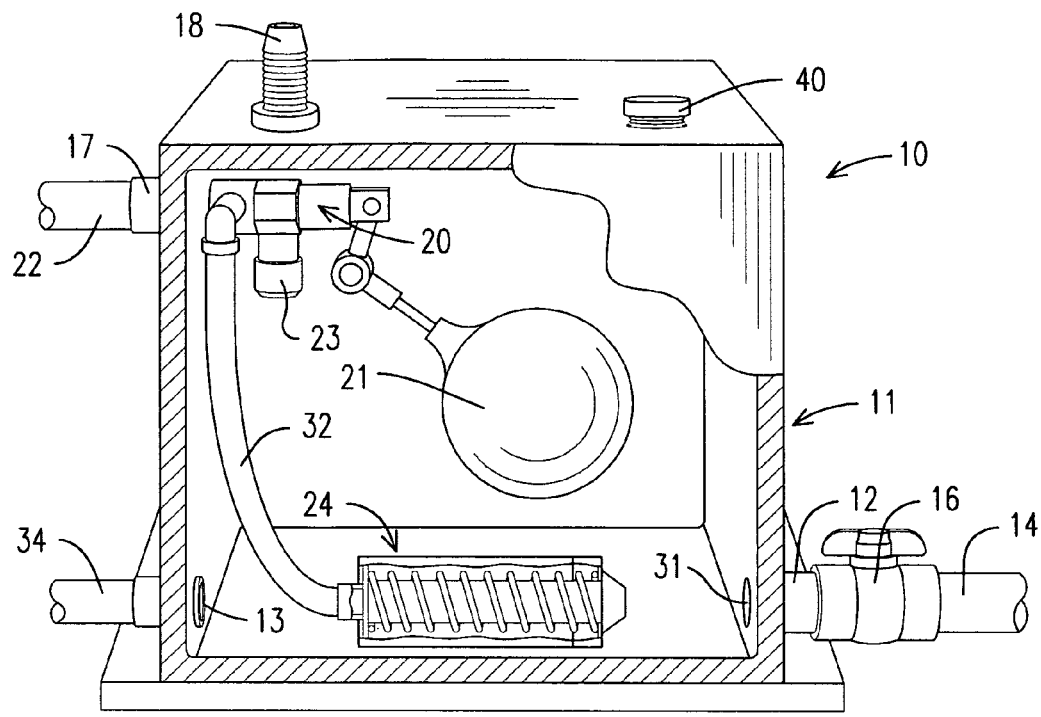
FIG. 1 is a cutaway perspective view of a marine engine generator flushing system in accordance with the present invention in which the liquid container is empty.
Figure 2:
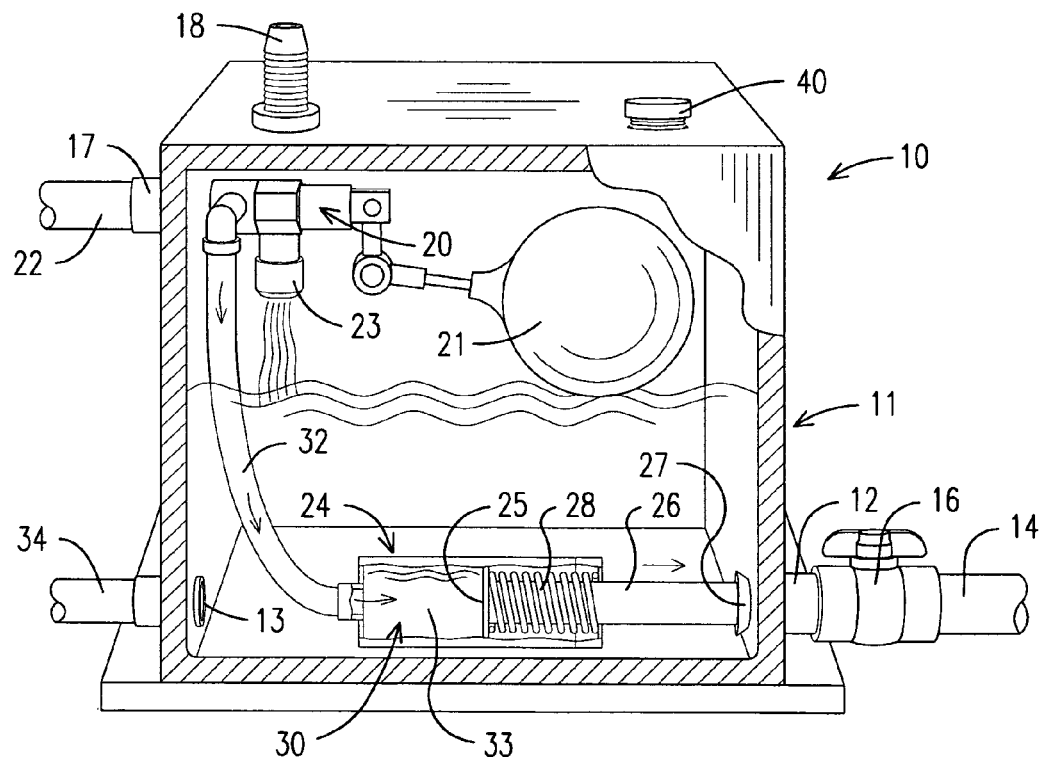
FIG. 2 is a cutaway perspective of the marine electric generator flushing system of FIG. 1 during a fresh water flushing of the marine generator.
Figure 3:
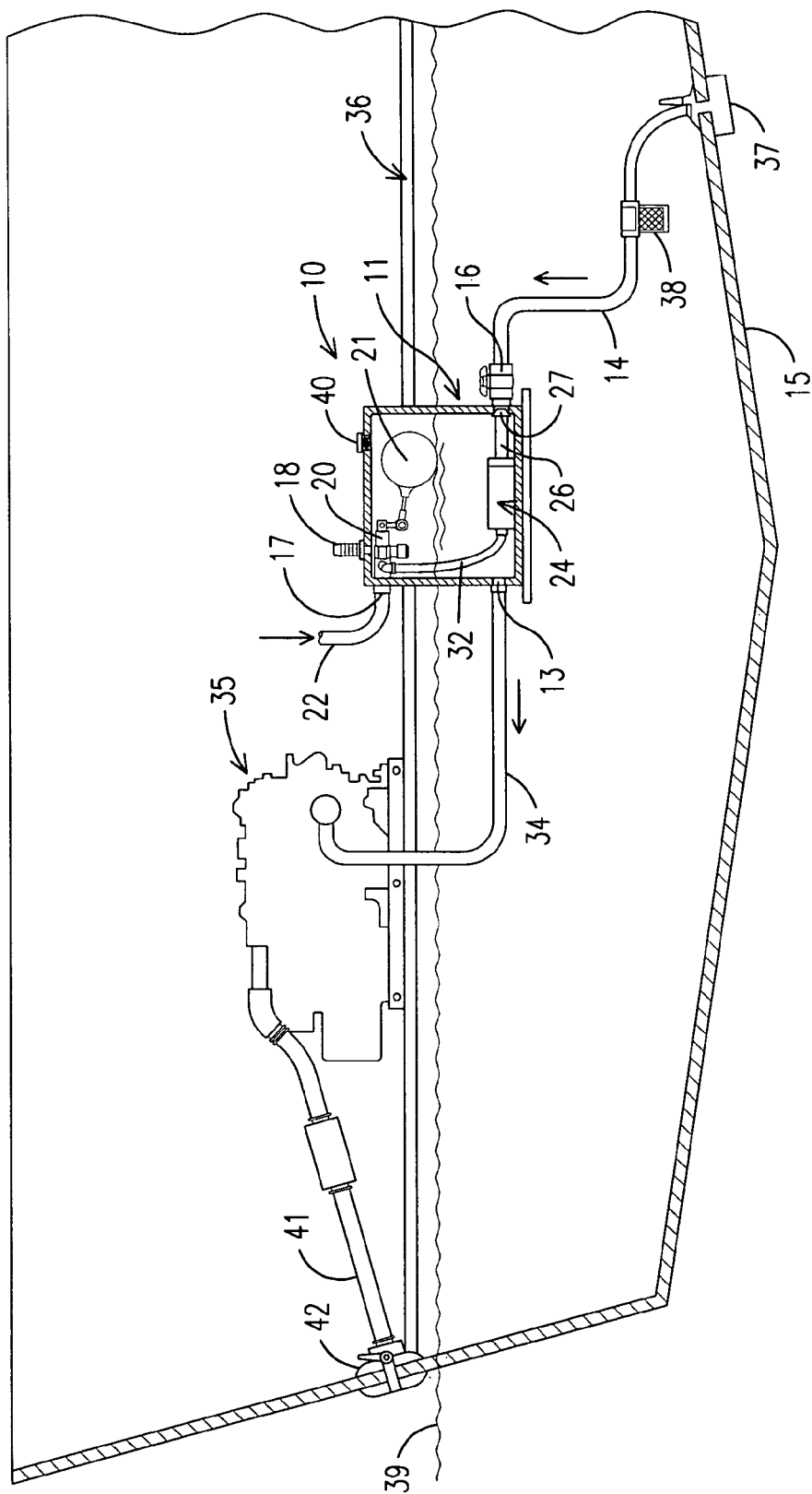
FIG. 3 is a diagrammatic sectional view of the generator flushing system of the present invention installed in a boat hull.

Referring to the drawings and especially to FIGS. 1 and 2, a marine electric generator flushing system 10 is used for flushing a water cooled inboard marine powered generator with fresh water and for winterizing of the generator. The flushing system 10 has a liquid container 11 having an inlet 12 and a container outlet 13. The container inlet 12 has a pipe or conduit 14 connecting the inlet to the exterior of the boat hull 15, as shown in FIG. 3. The inlet 12 has a manually operated valve 16 for cutting off the inlet of raw cooling water through the raw water inlet conduit 14 into the liquid container 11. The liquid container also has a fresh water inlet 17 connected thereinto and an air bleed 18 connected through the top of the inlet. A float valve 20 has a ball float 21 which rises and falls with the level of the water in the liquid container. As shown in FIG. 2, the partially filled liquid container has raised the ball float 21 to close off the float valve 20. Water from a water hose or fresh water source enters through conduit 22 into the inlet 17 and passes out the float valve outlet 23 until the water level reaches a predetermined level, raising the float 21 to shut off the float valve 20.

A container inlet valve 24 is mounted within the liquid container 11. It is actuated by a piston 25 driving a rod 26 having a valve element 27 thereon against the bias of a spring 28. Water 30 under pressure drives the piston 25, valve element 27 against the valve seat 31 formed in the end of the inlet 12, as seen in FIG. 2. A conduit 32 connects the inlet 17 to the valve chamber 33 and is connected to the inlet 17 ahead of the float valve 20 so that any time fresh water under pressure is applied from a fresh water hose, or the like, through the conduit 22 into the inlet 17, it is also applied through the conduit 32 into the valve 24 where it drives a piston 25 to drive the valve element 27 against the valve seat 31 and close the raw water inlet 12. This can be seen as only happening when a fresh water source is attached to the conduit 22 which is simultaneously allowing water to pass through the float valve 20 until the float 21 reaches a predetermined level, shutting off the float valve but not the passage of water through the conduit 32.

The liquid container outlet 13 has a liquid conduit 34 which connects the liquid container 11 to the marine electric generator 35, as seen in FIG. 3.

Referring to FIG. 3, the marine electric generator flushing system 10 has a liquid container 11 mounted in a boat hull 12 and positioned along, the middle of the water line 36 for the boat hull 15. The water line 36 is the level of the water on the exterior of the hull when the boat is in the water. The boat hull has a hull inlet 37 connected through a filter 38 to the raw water inlet conduit 14 which connects through the manual valve 16 through the inlet 12 to the liquid container 11. As seen in this figure, the raw water inlet valve 24 has the valve seat 27 extended to block the entry of raw water through the conduit 14 and has thus been pressurized from water pressure in the fresh water inlet 22 through the conduit 32. The fresh water level in the liquid container is controlled by the float valve 20 by the rising and falling of the ball float 21. A liquid container 11 can also be seen as having an entry 40 therein which can be used for putting antifreeze into the electric container 11 during winterizing.

FIG. 3 shows the exhaust water conduit 41 which passes the cooling water entering the generator 35 from the conduit 34 out the conduit 41 and out an exhaust water outlet 42.

In operation, the boat 15 draws raw water through the opening 37 through the conduit 14 and into the liquid container 11 when the valve 24 is open, as shown in FIG. 1. The water entering the liquid conduit 11 passes through the liquid container outlet 13 through the conduit 34 and through the generator 35 cooling system and out the outlet 41. The water level in the liquid container 11 is controlled by the water level 39 on the exterior of the hull. When it is desired to flush the system while the hull is still in the water, a water hose can be connected to the line 22 to apply water under pressure to the float valve 20 which fills the liquid container until the float 21 rises to a shutoff position. Simultaneously, the pressurized water in the conduit 22 is passed through the conduit 32 and applies pressure to the raw water inlet valve 24, as seen in FIG. 2, which drives the piston 25 against the spring 28 to drive the valve element 27 into the valve seat 31 of the inlet 12 to close off raw water entering from line 14. This allows fresh water in the liquid container 11 to be drawn through the conduit 34 and through the electric generator 35 to flush the electric generator cooling system with fresh water.

When winterizing the boat, the manual valve 16 can be closed and antifreeze, or the like, added through the opening 40 into the liquid container 11 where it can be drawn through the conduit 34 and the electric generator 35 during winterization.

It should be clear at this time that a marine electric generator flushing system has been provided which advantageously allows the generator to be flushed while the boat is in the water rather than connecting a pressurized hose directly to the generator cooling system inlet and risking damaging the electric generator. However, the present invention should not be construed as limited to the forms shown which are to be considered illustrative rather than restrictive.

I claim:

1. A marine electric generator flushing system for a boat comprising:

a liquid container mounted in a boat hull having a water cooled marine electric generator therein; a container inlet having an inlet conduit connected thereto from an exterior of said boat hull for the passage of raw water therethrough into said liquid container;

a container outlet having an outlet conduit connected thereto for coupling said liquid container outlet to said marine electric generator for passing cooling water from said liquid container to said electric generator;

an exhaust conduit connected between said marine electric generator and the exterior of said boat for the passage of cooling water from said electric generator to the exterior of said boat;

a fresh water inlet connected into said liquid container for feeding fresh water into said liquid container when a fresh water source is connected thereto;

a float valve located in said liquid container and operatively connected to said fresh water inlet to control the flow of fresh water into said liquid container responsive to a level of water in said container; and a container inlet valve located in said liquid container for closing said container inlet, said container inlet valve being connected to said fresh water inlet valve for activating said container inlet valve responsive to water pressure from said fresh water inlet when fresh water is applied to said fresh water inlet;

whereby said liquid container has raw cooling water from said container inlet cut off when fresh water under pressure is applied to said fresh water inlet as fresh water is entering said liquid container to allow said marine electric generator to be flushed with fresh water from said liquid container while blocking the entrance of raw cooling water entering said liquid container.

2. The marine electric generator flushing system for a boat in accordance with claim 1 in which said container inlet valve has a water pressure activated piston therein for driving a valve element against a valve seat thereby blocking the entry of raw cooling water into said container.

3. The marine electric generator flushing system for a boat in accordance with claim 2 in which said container inlet valve piston is spring loaded to hold said valve element in a container inlet open position until water pressure is applied to said container inlet valve piston.

4. The marine electric generator flushing system for a boat in accordance with claim 3 in which said float valve closes off said fresh water inlet upon said liquid container having a predetermined level of liquid thereon.

5. The marine electric generator flushing system for a boat in accordance with claim 4 in which said float valve has a float that rises and falls with the water level in said liquid container.

6. The marine electric generator flushing system for a boat in accordance with claim 5 in which said container inlet valve has a manually operated valve which can be closed when winterizing said marine electric generator cooling system.

7. The marine electric generator flushing system for a boat in accordance with claim 6 in which said liquid conduit inlet has the container inlet valve's valve seat formed therein.

8. The marine electric generator flushing system for a boat in accordance with claim 7 in which said container inlet valve is connected to said fresh water inlet by a conduit therebetween.

\* \* \* \* \*